P. A. ROSENTHAL.
LOCKING DEVICE.
APPLICATION FILED MAY 1, 1916.

1,195,093.

Patented Aug. 15, 1916.

WITNESSES
Frederick Diehl.

INVENTOR
Philip A. Rosenthal
BY
ATTORNEYS

UNITED STATES PATENT OFFICE.

PHILIP A. ROSENTHAL, OF NEW YORK, N. Y.

LOCKING DEVICE.

1,195,093.  Specification of Letters Patent.  Patented Aug. 15, 1916.

Application filed May 1, 1916.  Serial No. 94,621.

*To all whom it may concern:*

Be it known that I, PHILIP A. ROSENTHAL, a citizen of the United States, and a resident of the city of New York, borough of Brooklyn, in the county of Kings and State of New York, have invented a new and Improved Locking Device, of which the following is a full, clear, and exact description.

The object of the invention is to provide a new and improved locking device more especially designed for use on bicycles, motor cycles and similar vehicles and machines, and arranged to enable the owner to quickly and conveniently lock the steering device against turning thus preventing an unscrupulous person from mounting and riding away with the vehicle.

In order to accomplish the desired result, use is made of interlocking members, of which one is mounted on the steering head and the other on the steering post, and key-controlled means for moving the said locking members apart to allow free turning of the steering device or for moving the locking members into locking engagement to hold the steering device against turning.

A practical embodiment of the invention is represented in the accompanying drawings forming a part of this specification, in which similar characters of reference indicate corresponding parts in all the views.

Figure 1:
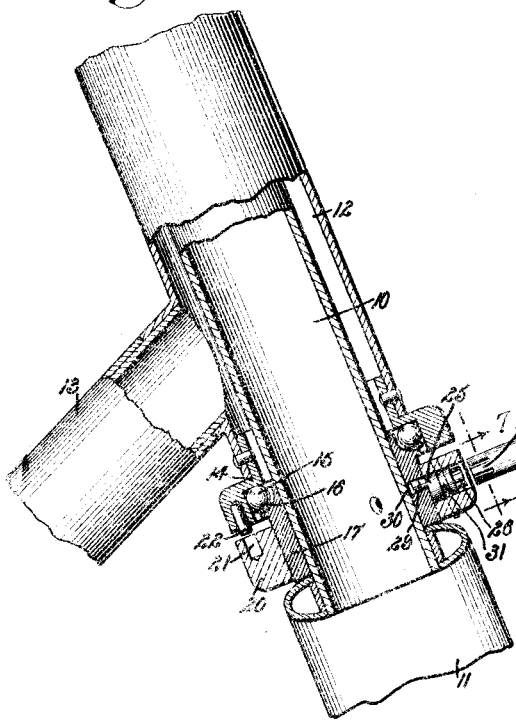
Figure 2:
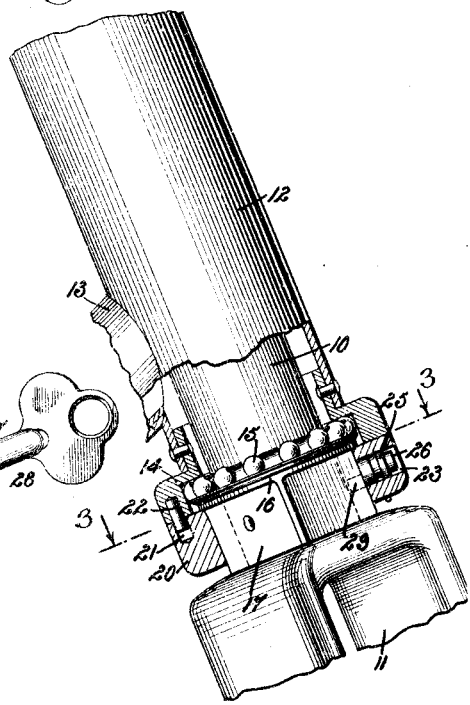
Figure 3:
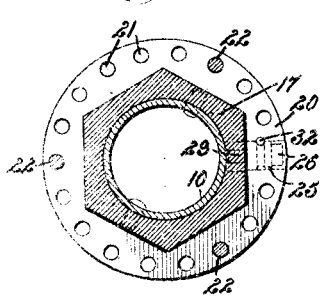
Figure 4:
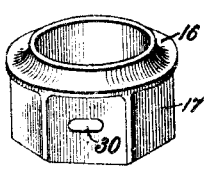
Figure 5:
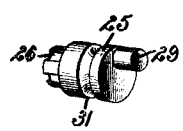
Figure 6:
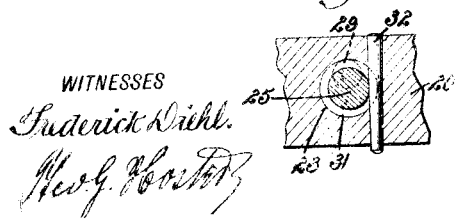
Figure 7:

Figure 1 is a sectional side elevation of the locking device as applied and with the parts in unlocked position; Fig. 2 is a similar view of the same with the parts in locked position; Fig. 3 is a sectional plan view of the same on the line 3—3 of Fig. 2; Fig. 4 is a perspective view of the bearing collar fixed to the steering post; Fig. 5 is a perspective view of the locking spindle; Fig. 6 is a sectional plan view of the same in position in the sliding sleeve; and Fig. 7 is an enlarged cross section of the key, the section being on the line 7—7 of Fig. 1.

The locking device is more especially designed for locking the steering post 10 of the steering fork 11 against turning in the steering head 12 of the frame 13 of a bicycle, motor cycle or other vehicle or machine. The lower end of the steering head 12 is provided with the usual ball bearing recess 14 engaged by a ball bearing 15 engaging a ball race 16 formed on the upper end of a collar 17 riveted or otherwise fastened to the steering post 10. The parts so far described are common to bicycles, motor cycles and other vehicles and machines of this type.

The exterior surface of the collar 17 is made polygonal (see Figs. 2, 3 and 4) and on this polygonal surface is mounted to slide up and down a sleeve 20, a portion of which is polygonal to correspond to the exterior surface of the collar 17 so that the sleeve 20 turns with the collar 17 and the steering post 10. The sleeve 20 is provided in its upper face with a series of recesses 21 arranged in a circle and adapted to be engaged by pins 22 depending from the under side of the ball bearing recess 14. Usually three pins 22 are employed placed equal distances apart and arranged in a circle registering with the circle containing the recesses 21 so that when the sleeve 20 is turned the pins 22 are adapted to engage corresponding recesses 21 on moving the sleeve 20 upward on the collar 17. Normally the collar 17 is in lowermost position, as shown in Fig. 1, with its pins 22 out of engagement with the corresponding recesses 21 to allow free turning of the steering post 10 in the steering head 12. When it is desired to lock the steering post 10 against turning in the steering head 12 then the sleeve 20 is moved upward on the collar 17 to engage the pins 22 with the corresponding recesses 21, as shown in Fig. 2.

In order to move the sleeve 20 up or down on the collar 17 key-controlled means are employed, arranged as follows: In the sleeve 20 is formed a radially disposed aperture 23 in which is mounted to turn a spindle 25 provided at its outer end with a reduced portion 26 adapted to be engaged by the bit 27 of a key 28 in possession of the owner of the vehicle or machine and adapted to be engaged with the reduced portion 26 whenever it is desired to turn the spindle 25 to raise or lower the sleeve 20. The inner end of the spindle 25 is provided with an eccentrically disposed pin 29 extending into a horizontal slot 30 formed in the collar 17. The spindle 25 is provided with an annular recess 31 engaged by a retaining pin 32 driven into the sleeve 20 to hold the spindle 25 against inward or outward movement in the opening 23. When the sleeve 20 is in lowermost position, as shown in Fig. 1, then the eccentric pin 29 is uppermost and when it is desired to move the sleeve 20 upward then the operator applies the key 28 and turns the spindle so that the pins 29 impart an upward movement to the sleeve 20 to move the pins 22 in engagement with the corresponding recesses 21, as shown in Fig. 2. When it is desired to move the sleeve 20 into unlocked position then the spindle is turned from the position shown in Fig. 2 to the position shown in Fig. 1 to return the sleeve 20 to normal lowermost position with a view to disengage the pins 22 from the recesses 21. By providing a large number of recesses 21 and a few pins 22 the steering post 10 can be locked against turning whenever the steering device is in a straight line steering position or in a turnout steering position. Thus, if desired, the handlebar on the upper end of the steering post 10 can be turned to its uttermost angular position and then the steering post can be locked against turning so that an unscrupulous person is practically prevented from mounting a vehicle and from riding away with the same as the vehicle would only travel in a circle when propelled. When the steering bar is in straight line steering position and the post 10 is locked in place against turning as above described, then it is difficult for an unscrupulous person to ride away with the machine as such person is unable to steer the machine.

The locking device shown and described is very simple and durable in construction and can be readily applied to bicycles, motor cycles and similar vehicles and machines as now generally constructed.

Having thus described my invention, I claim as new and desire to secure by Letters Patent:

1. A locking device for the steering mechanism of bicycles, motor cycles and other machines, comprising interlocking members, of which one is fixed on the steering head and the other is slidable up and down on the steering post, the said movable member when in lowermost position being out of locking engagement with the said fixed member, means to constrain the movable member to turn with the steering post and a key-controlled spindle mounted to turn in the said movable member and provided with an eccentric pin engaging a slot in the steering post.

2. A locking device for the steering mechanism of bicycles, motor cycles and other machines, comprising interlocking members, one of the said members being fixed on the steering head and the other being movable and having a polygonal bore, a polygonal collar secured to the steering post and on which slides the said movable member, the said collar having a sidewise extending slot, and a key-controlled spindle mounted to turn in the said movable member and provided at its inner end with an eccentric pin engaging the said slot.

3. A locking device for the steering mechanism of bicycles, motor cycles and other machines, comprising interlocking members, one of the said members being in the form of spaced pins arranged in a circle and depending from the under side of the steering head, and the other member being in the form of a sleeve having a series of apertures arranged in a circle and adapted to be engaged by the said pins, the said sleeve having a polygonal bore slidably fitting on a polygonal portion of the steering post, the sleeve having a sidewise extending slot, and a key-controlled spindle mounted to turn in the said sleeve and provided at its inner end with an eccentric pin engaging the said slot.

PHILIP A. ROSENTHAL.

Witnessed by—
ADOLF HOROWITZ.